United States Patent
Lee et al.

(10) Patent No.: US 12,520,456 B2
(45) Date of Patent: Jan. 6, 2026

(54) SEMICONDUCTOR DEVICE

(71) Applicant: Samsung Electronics Co., Ltd., Suwon-si (KR)

(72) Inventors: Sungki Lee, Seoul (KR); Jiyong Kim, Suwon-si (KR); Insub Kwak, Seoul (KR); Suin Kim, Seoul (KR); Chunghyun Ryu, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 916 days.

(21) Appl. No.: 17/342,995

(22) Filed: Jun. 9, 2021

(65) Prior Publication Data

US 2022/0132701 A1    Apr. 28, 2022

(30) Foreign Application Priority Data

Oct. 22, 2020 (KR) .................. 10-2020-0137299

(51) Int. Cl.
| | |
|---|---|
| *H05K 7/20* | (2006.01) |
| *G06F 1/18* | (2006.01) |
| *H05K 1/02* | (2006.01) |
| *H05K 5/02* | (2006.01) |

(52) U.S. Cl.
CPC ......... *H05K 7/20336* (2013.01); *G06F 1/181* (2013.01); *H05K 1/0213* (2013.01); *H05K 5/0217* (2013.01)

(58) Field of Classification Search
CPC ............ H05K 7/20336; H05K 1/0213; H05K 5/0217; H05K 9/0037; G06F 1/181; G06F 1/20; G06F 1/182; H01L 23/367; H01L 23/02; H01L 23/552; G11B 23/0305
See application file for complete search history.

(56) References Cited

U.S. PATENT DOCUMENTS

| | | | |
|---|---|---|---|
| 8,125,788 B2 * | 2/2012 | Hatanaka | H03H 9/0542 |
| | | | 361/764 |
| 9,668,377 B2 * | 5/2017 | Lim | H05K 1/0203 |
| 9,958,914 B2 | 5/2018 | Kim | |
| | (Continued) | | |

FOREIGN PATENT DOCUMENTS

| | | | | |
|---|---|---|---|---|
| JP | 2019 032134 | * | 2/2019 | ............... H05K 7/20 |
| KR | 10-1478721 B1 | | 1/2015 | |
| KR | 10-2019-0053589 A | | 5/2019 | |

OTHER PUBLICATIONS

Office Action issued on Jan. 2, 2025 for Korean Application No. 10-2020-0137299.

*Primary Examiner* — Imani N Hayman
*Assistant Examiner* — Hung Q Dang
(74) *Attorney, Agent, or Firm* — Harness, Dickey & Pierce, P.L.C.

(57) ABSTRACT

A semiconductor device includes a first case, a second case coupled to the first case to form an inner space, a memory module disposed within the inner space, and including a module substrate and a plurality of electronic components mounted on the module substrate, and a heat dissipation chamber assembly provided in at least a portion of the first case, and including a heat diffusion chamber in thermal contact with at least one of the electronic components and a sidewall structure extending vertically toward the module substrate to surround the electronic component in thermal contact with the heat diffusion chamber.

20 Claims, 10 Drawing Sheets

(56) References Cited

U.S. PATENT DOCUMENTS

| | | |
|---|---|---|
| 11,437,328 B2 * | 9/2022 | Wang .................... H01L 23/552 |
| 2014/0078679 A1 | 3/2014 | Tsunoda et al. |
| 2020/0075453 A1 | 3/2020 | Kim et al. |
| 2020/0077547 A1 | 3/2020 | Lee et al. |
| 2020/0182554 A1 | 6/2020 | Wang et al. |
| 2020/0196495 A1 | 6/2020 | Kang et al. |

* cited by examiner

SEMICONDUCTOR DEVICE

CROSS-REFERENCE TO RELATED APPLICATION

This application claims priority under 35 U.S.C. § 119 to Korean Patent Application No. 10-2020-0137299, filed on Oct. 22, 2020 in the Korean Intellectual Property Office (KIPO), the contents of which are herein incorporated by reference in their entirety.

BACKGROUND

1. Field

Example embodiments relate to a semiconductor device. More particularly, example embodiments relate to a memory module such as a solid state drive (SSD) device.

2. Description of the Related Art

When a solid state drive (SSD) device is used as a storage device, it may be possible to input and output large amounts of data at a high speed, and thus, as demand for higher performance electronic devices increases the demand for SSD device is also increasing. The SSD device may be generally provided in the form of a package in which memory chips are mounted on a printed circuit board (PCB), and such an SSD package may be embedded in a closed type case or open type case. However, as the data processing speed of the SSD device increases, solutions for preventing noises due to external electrostatic discharge and for securing excellent heat dissipation characteristics may be required.

SUMMARY

Example embodiments provide a semiconductor device having a structure capable of securing excellent heat dissipation characteristics and shielding electromagnetic/electrostatic discharge.

According to some example embodiments, a semiconductor device includes a first case and a second case, the first case and second case defining an inner space; a substrate; at least one electronic component on the substrate; and a heat dissipation chamber assembly between the substrate and at least a portion of the first case, the heat dissipation chamber including a heat diffusion chamber in thermal contact with the least one electronic component and a sidewall structure extending vertically toward the substrate, the sidewall structure surrounding the at least one electronic component.

According to some example embodiments, a semiconductor device includes a first case including a base plate and a heat dissipation chamber assembly, the heat dissipation chamber assembly including a heat diffusion chamber; a second case; a substrate between the first case and the second case; and at least one electronic component on the substrate. The heat diffusion chamber overlaps and thermally contacts the at least one electronic component.

According to some example embodiments, a semiconductor device includes a first case including a base plate; a second case; a substrate between the first case and the second case; and at least one electronic component on the substrate; and a heat dissipation chamber assembly between the module and at least a portion of the first case, the heat dissipation chamber assembly including a heat diffusion chamber in thermal contact with the at least one electronic component and a sidewall structure extending vertically toward the substrate and surrounding the at least one electronic component According to some example embodiments, a semiconductor device may include a first case and a second case coupled to each other with a memory module interposed therebetween. The semiconductor device may include a heat dissipation chamber assembly in at least a portion of the first case. The heat dissipation chamber assembly may include a heat diffusion chamber in thermal contact with at least one electronic components mounted on a substrate of the memory module and a sidewall structure extending vertically toward the module substrate and surrounding the at least one electronic component.

Accordingly, the heat diffusion chamber may use a heat transfer fluid, such as vapor, to dissipate heat from the electronic component to the outside to increase and/or maximize heat dissipation performance. Further, since the sidewall structure surrounds the at least one electronic component and is grounded to a ground pattern of the module substrate, it may be possible to shield the at least one electronic component from EMI/ESD radiation noises while maintaining a sealed structure. Further, since a mold structure for the first case can be manufactured by reflecting only a mold structure for the heat dissipation chamber assembly, an increase in manufacturing cost may be prevented.

BRIEF DESCRIPTION OF THE DRAWINGS

Example embodiments will be more clearly understood from the following detailed description taken in conjunction with the accompanying drawings.

FIG. 1 is a perspective view illustrating a semiconductor device in accordance with some example embodiments.

FIG. 2 is an exploded perspective view illustrating the semiconductor device in FIG. 1.

FIG. 3 is a cross-sectional view taken along the line A-A' in FIG. 1.

FIG. 4 is a cross-sectional view taken along the line B-B' in FIG. 1.

FIG. 5 is a perspective view illustrating a first case of the semiconductor device in FIG. 1.

FIG. 6 is an exploded perspective view illustrating the first case in FIG. 5.

FIG. 7 is an enlarged cross-sectional view illustrating a portion of a heat dissipation chamber assembly provided in the first case in FIG. 4.

FIG. 8 is a partial cutaway perspective view illustrating a portion of the heat dissipation chamber assembly in FIG. 7.

FIG. 9 is a cross-sectional view illustrating a portion of a semiconductor device in accordance with some example embodiments.

FIG. 10 is a cross-sectional view illustrating a portion of a semiconductor device in accordance with some example embodiments.

FIG. 11 is a cross-sectional view illustrating a portion of a semiconductor device in accordance with some example embodiments.

FIG. 12 is a cross-sectional view illustrating a portion of a semiconductor device in accordance with some example embodiments.

FIG. 13 is a plan view illustrating a first case of a semiconductor device in accordance with some example embodiments.

FIG. 14 is a plan view illustrating a first case of a semiconductor device in accordance with some example embodiments.

FIG. 15 is a plan view illustrating a first case of a semiconductor device in accordance with some example embodiments.

DETAILED DESCRIPTION OF EXAMPLE EMBODIMENTS

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "lower," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Thus, the device may be otherwise oriented (rotated 90 degrees or at other orientations) and the spatially relative descriptors used herein interpreted accordingly.

Hereinafter, example embodiments will be explained in detail with reference to the accompanying drawings.

Figure 1:
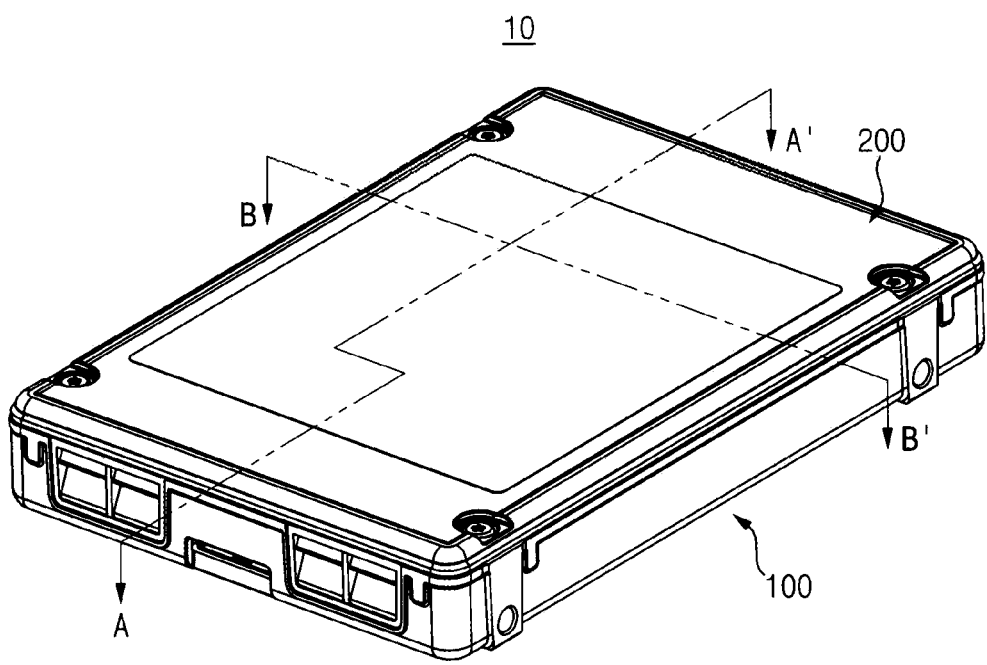
FIGS. 1 to 15 represent non-limiting, example embodiments as described herein.
Figure 2:
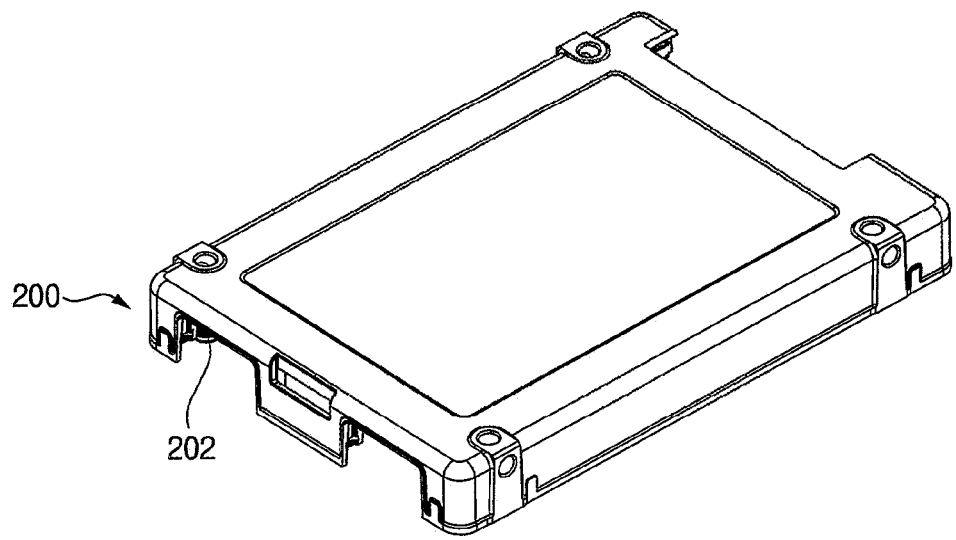
Figure 2:
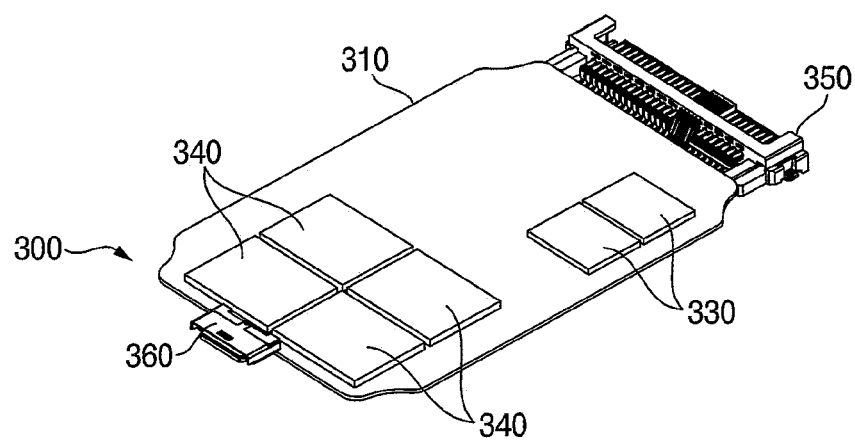
Figure 2:
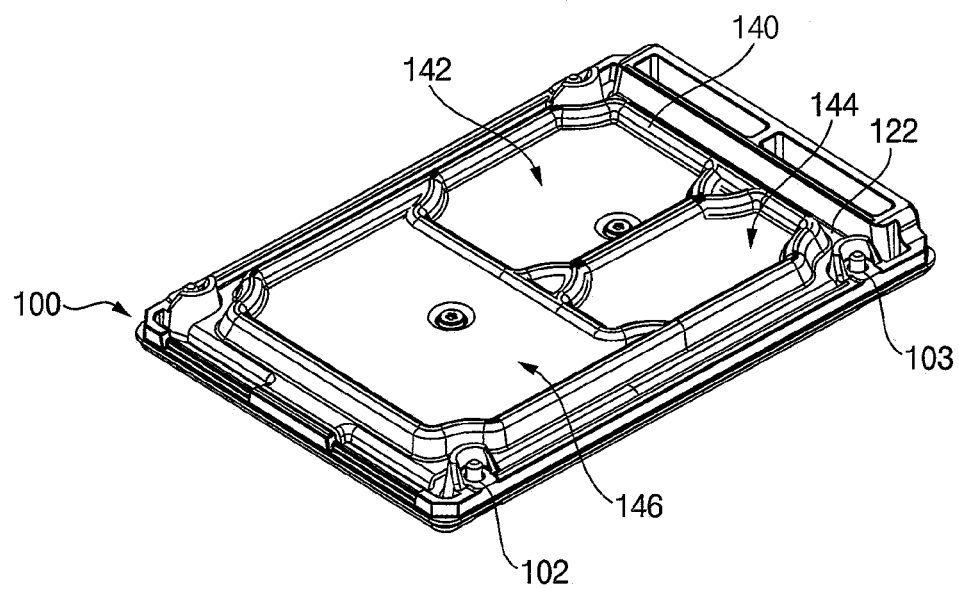
Figure 3:
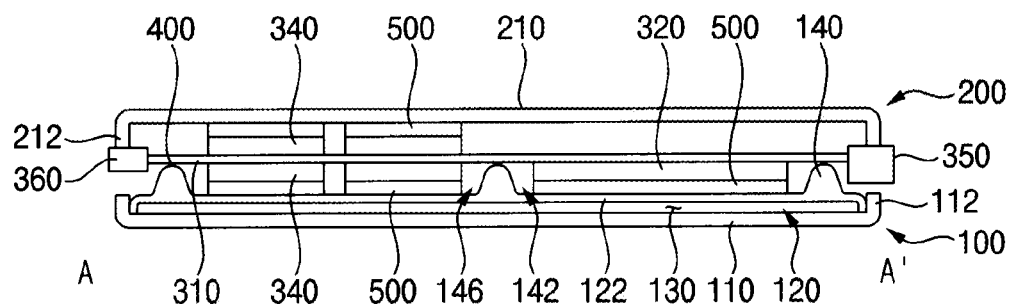
Figure 4:
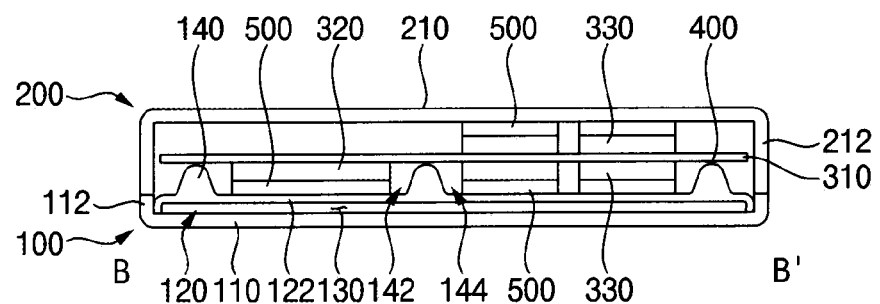
Figure 5:
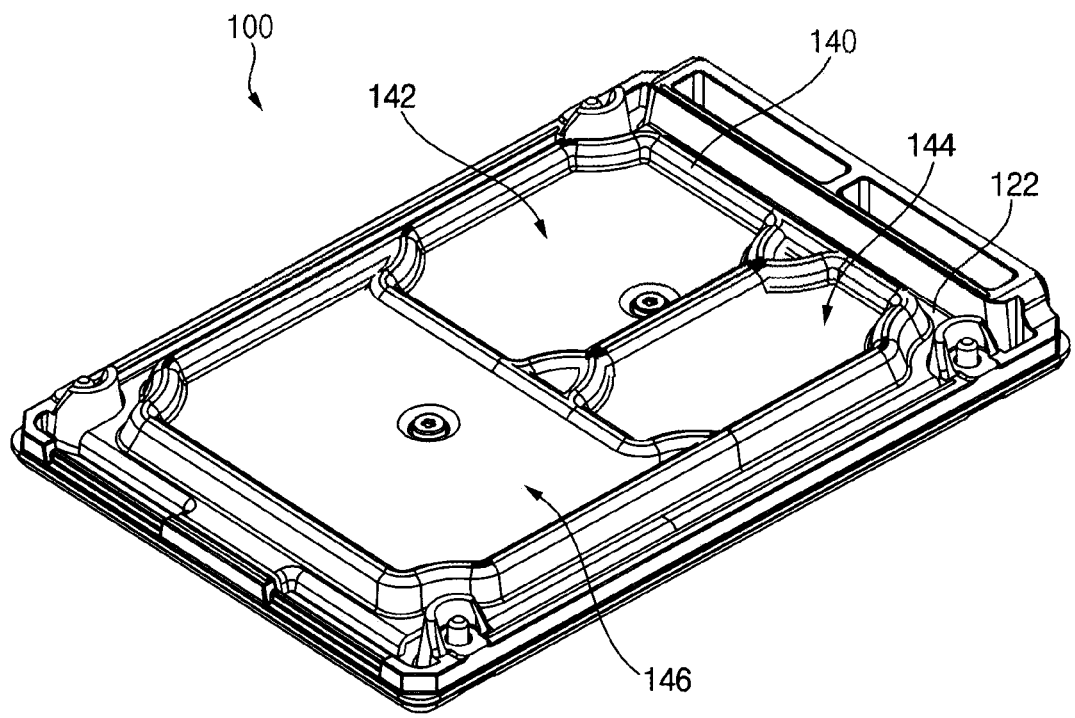
Figure 6:
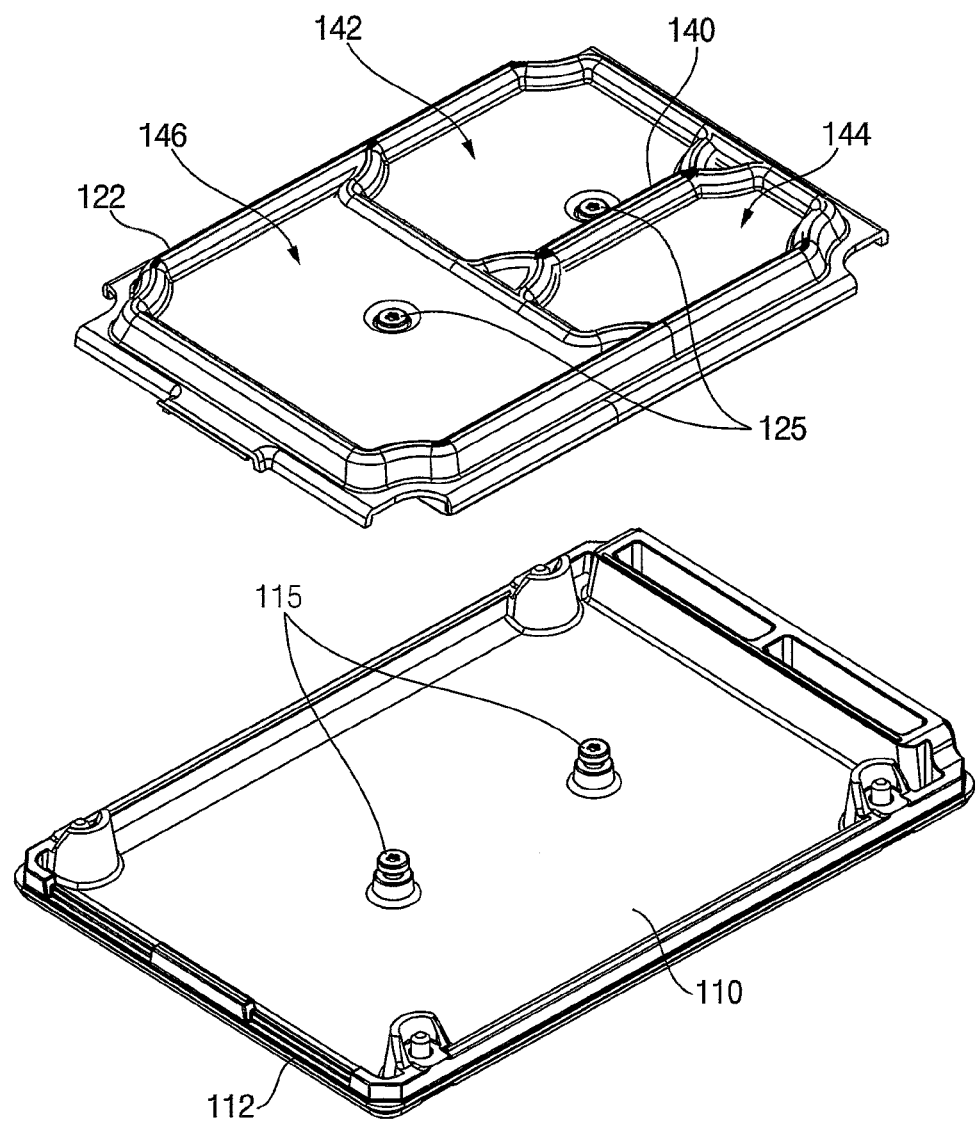
Figure 7:
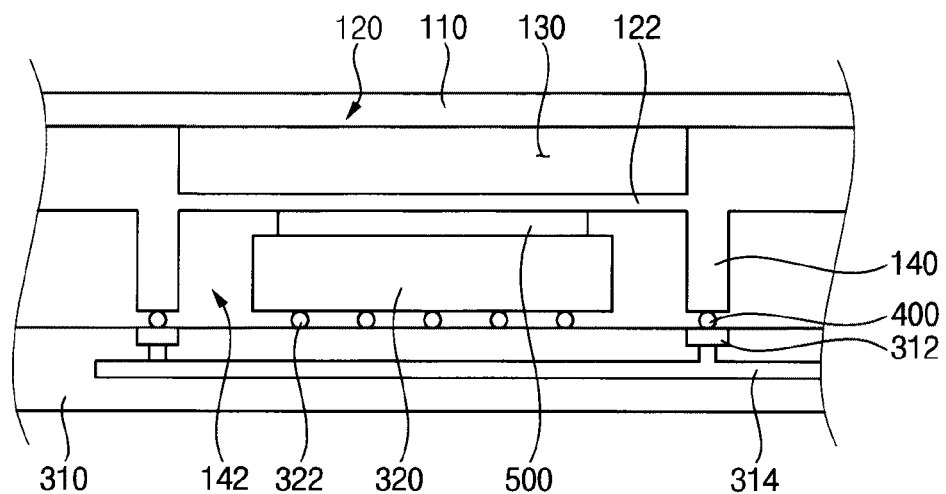
Figure 8:
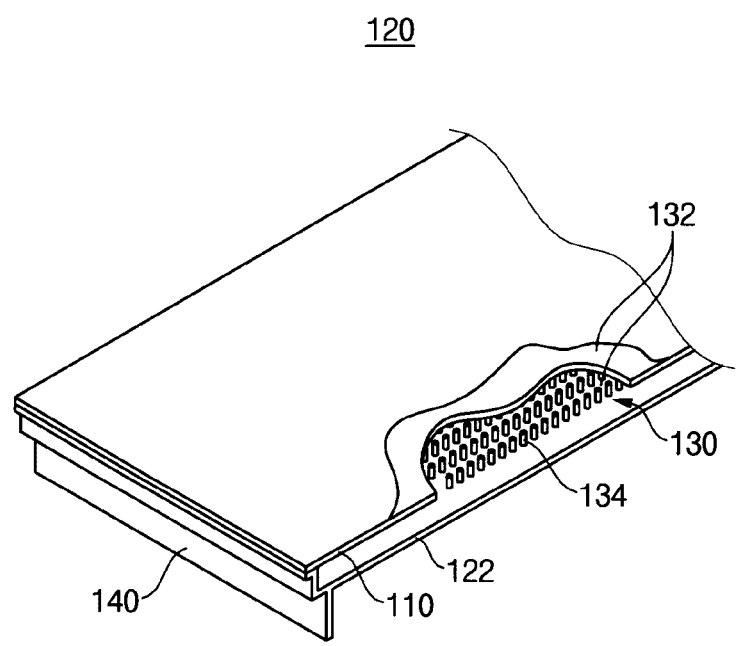

FIG. 1 is a perspective view illustrating a semiconductor device in accordance with some example embodiments. FIG. 2 is an exploded perspective view illustrating the semiconductor device in FIG. 1. FIG. 3 is a cross-sectional view taken along the line A-A' in FIG. 1. FIG. 4 is a cross-sectional view taken along the line B-B' in FIG. 1. FIG. 5 is a perspective view illustrating a first case of the semiconductor device in FIG. 1. FIG. 6 is an exploded perspective view illustrating the first case in FIG. 5. FIG. 7 is an enlarged cross-sectional view illustrating a portion of a heat dissipation chamber assembly provided in the first case in FIG. 4. FIG. 8 is a partial cutaway perspective view illustrating a portion of the heat dissipation chamber assembly in FIG. 7.

Referring to FIGS. 1 to 6, a semiconductor device 10 may include a first case 100, a second case 200, a memory module 300 disposed in a space defined by the first and second cases 100 and 200, and a heat dissipation chamber assembly 120 provided in the first case 100.

In some example embodiments, the semiconductor device 10 may be an electronic device such as a solid state drive (SSD). In some example embodiments, the semiconductor device 10 may be configured as a portable storage device. The memory module 300 may be provided in the form of a package in which electronic components (e.g., memory chips and/or processors) are mounted on a module board (such as a printed circuit board), and the memory module 300 may be embedded in a closed type and/or open type case.

The first case 100 and the second case 200 may be coupled to each other to form an inner space therebetween. For example, screw holes 102 and 202 may be located in peripheral regions of the first and second cases 100 and 200, and screws 103 may be inserted into the screw holes 102 and 202, so that the first and second cases are combined with each other. However, the example embodiments are not limited thereto, and other methods of coupling the first case 100 and the second case 200 (e.g., bolts, fasteners, adhesives, latches, snaps, and/or the like) may be included. In some example embodiments, the first case 100 may be a lower case, and the second case 200 may be an upper case, but may not be limited thereto.

The first case 100 may include a first base plate 110 and a first sidewall portion 112 extending upwardly along a periphery of the first base plate 110. The first base plate 110 may have an inner surface and an outer surface. The first base plate 110 and the first sidewall portion 112 may be formed integrally with each other. For example, a sheet may be stamped and/or molded to form the first base plate 110 and the first sidewall portion 112. In some example embodiments, the first base plate 110 and the first sidewall portion 112 may include a metal such as aluminum.

In some example embodiments, the heat dissipation chamber assembly 120 may be provided in a portion of the first case 100. For example, in some embodiments, the heat dissipation chamber assembly 120 may be on disposed between the first sidewall portions 112 of the first case 100. As illustrated in FIG. 6, the first case 100 and the heat dissipation chamber assembly 120 may be coupled by the insertion of a plug 115 into a socket 125. In some embodiments, the plug 115 and the socket 125 may include screw holes. However, the example embodiments are not limited thereto, and other methods of coupling the first case 100 and the heat dissipation chamber assembly 120 (e.g., bolts, fasteners, adhesives, latches, snaps, and/or the like) may be included. In some example embodiments, a gasket (not illustrated) may be included between the plug 115 and the socket 125.

The heat dissipation chamber assembly 120 may include a vapor chamber 130 as a heat diffusion chamber provided on the inner surface of the first base plate 110. The vapor chamber 130 may be provided in a first region of the first base plate 110. The vapor chamber 130 may be arranged to overlap at least one of electronic components of the memory module 300. For example, the vapor chamber 130 may be arranged on the electronic component, and the vapor chamber 130 may be arranged to cover at least a portion of the electronic component. When viewed from plan view, the vapor chamber 130 may occupy at least the same area as the electronic components. For example, the vapor chamber 130 may be under at least some electronic components of the memory module 300.

The heat dissipation chamber assembly 120 may include a chamber plate 122 for forming the vapor chamber 130. The chamber plate 122 may have a rectangular shape covering the portion of the first base plate 110. In some example embodiments, the chamber plate 122 may cover the entire inner area of the first base plate 110. The chamber plate 122 may be arranged on the inner surface of the first base plate 110 to form the vapor chamber 130. The vapor chamber 130 may have a planar area corresponding to a corresponding electronic component of the memory module 300. The heat dissipation chamber assembly 120 may be attached to the first case 100 using an attaching method such as stamping, inserting, etc.

The heat dissipation chamber assembly 120 may further include a sidewall structure 140 extending from the chamber plate 122 toward the memory module 300. The sidewall structure 140 may be, for example, a rib-shaped structure extending to and/or surrounding the electronic component in thermal contact with the chamber plate 122. The sidewall structure 140 may be integrally formed with the chamber plate 122. For example, a sheet may be stamped and/or molded to form the sidewall structure 140 and the chamber plate 122.

The sidewall structure 140 may form a plurality of receiving grooves. For example, the sidewall structure 140 may include first to third receiving grooves 142, 144, and 146 for receiving a plurality of the electronic components respectively. As will be described later, the sidewall structure 140 may block electrostatic (ESD) radiation noise which penetrates from the outside and may serve as an electromagnetic interference (EMI) shield.

In some example embodiments, the memory module 300 may be supported on and/or by the first case 100. The memory module 300 may be an SSD device. The memory module 300 may include a module substrate 310 and a plurality of electronic components mounted on the module substrate 310.

The module substrate 310 may be a single-layered and/or multi-layered circuit substrate having an upper surface and a lower surface opposite to each other. For example, the module substrate 310 may be a printed circuit board (PCB). The PCB may include wirings and vias connected to the wirings. The wirings may include printed circuit patterns for interconnection with the electronic components.

The module substrate 310 may extend in a first direction (e.g., a lengthwise direction). The module substrate 310 may have a rectangular and/or square shape. For example, in some embodiments, the rectangular and/or square shape may include shapes with four sides. In some embodiments, the corners of the rectangular and/or square shape may be rounded and/or clipped. However, the example embodiments are not limited thereto, and the module substrate 310 may include other shapes, for example, an irregular polygon, an ovoid, and/or the like. The module substrate 310 may have a first side portion and a second side portion opposite to each other. A connector 350 may be provided in the first side portion of the module substrate 310. The connector 350 may include connection terminals for connecting and communicating with a host system (not illustrated). A power supply terminal 360 for supplying power to the electronic components may be provided in the second side of the module substrate 310.

In example embodiments, a plurality of the electronic components may be mounted on the module substrate 310. The electronic components may include an SSD controller 320, non-volatile memory devices 340 and buffer memory devices 330. The electronic components may be mounted on the module substrate 310 along the first direction to be provided as solid state drive (SSD). The SSD controller 320 may be, for example, processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

In some example embodiments, the semiconductor device 10 may be used as a portable SSD for replacing a hard disk in a computer (e.g., PC, notebook, etc.), and/or in a mobile device (e.g., a smart phone, tablet PC, digital camera, MP3 player, PDA, etc.).

The semiconductor device 10 may be configured to be attached to or detached from the host system through the connector 350. For example, the host system may be a computer and/or mobile device. The connector 350 of the module substrate 310 may include, for example, a female connector. Accordingly, the semiconductor device 10 may be electrically connected to the host system through the connector.

The SSD controller 320 may be arranged adjacent to the first side portion on the lower surface of the module substrate 310. The SSD controller 320 may be mounted on the lower surface of the module substrate 310 via connection members 322 (referring to FIGS. 7 and 9-12) such as solder balls.

The SSD controller 320 may communicate a signal with the host using a host interface. The host interface may include a universal serial bus (USB), a small computer system interface (SCSI), a PCI express, an ATA, a parallel ATA, a serial ATA, a serial attached SCSI, etc. For example, the signal communicated between the SSD controller 320 and the host may include a command, an address, data, etc. The SSD controller 320 may analyze and process the signal inputted from the host.

A plurality of the non-volatile memory devices 340 may be arranged adjacent to the second side portion on the lower and/or upper surface(s) of the module substrate 310. For example, non-volatile memory devices 340 may be disposed on the lower surface of the module substrate 310. Additionally, non-volatile memory devices 340 may be disposed on the upper surface of the module substrate 310. Though four non-volatile memory devices 340 are illustrated as disposed on the upper surface of the module substrate 310, the example embodiments are not limited thereto, and the number of non-volatile memory devices 340 on the upper and/or lower surface(s) of the module substrate 310 may be greater than and/or less than four.

The non-volatile memory devices 340 may be used as a storage medium of the SSD. For example, the non-volatile memory device 340 may include NAND flash memories. The non-volatile memory devices 340 may be connected to the SSD controller 320 through at least one channel CH. The SSD may use non-volatile memories such as phase change random access memory (PRAM), magnetoresistive RAM (MRAM), resistive RAM (ReRAM), ferroelectric RAM (FRAM), etc. as the storage medium in place of flash memory.

The buffer memory device 330 may be arranged adjacent to the SSD controller 320 in a plan of the module substrate 310. The buffer memory device 330 may be on the lower and/or upper surface of the module substrate 310. The buffer memory device 330 may be used as a buffer area temporarily storing data received from the host and/or temporarily storing data read from the non-volatile memory devices 320. Additionally, the buffer memory device 330 may be used to drive software used for an effective management of the non-volatile memory devices 340. Further, the buffer memory device 330 may be used to store meta data received from the host and/or may be used to store cache data.

For example, the buffer memory device 330 may include at least one dynamic RAM (DRAM) package. The DRAM package may include a package substrate and at least one DRAM chip mounted on the package substrate. The SSD may be embodied by replacing the DRAM with volatile memories such as static RAM (SRAM_, etc. and/or non-volatile memories such as flash memory, FRAM, MRAM, ReRAM, FRAM, etc.

Although it is not illustrated in the figures, the memory module 300 may further include a power management IC (PMIC) for adjusting a power applied to the electronic elements and/or passive devices such as capacitor.

As illustrated in FIGS. 3 and 4, the memory module 300 may be arranged on the heat dissipation chamber assembly 120 such that the lower surface of the module substrate 310 faces the first base plate 110 of the first case 100. For example, the SSD controller 320, the buffer memory devices 330, and the non-volatile memory devices 340 may be arranged to overlap the heat dissipation chamber assembly 120.

The SSD controller 320 may thermally contact an upper surface of the chamber plate 122 through a thermal interface material (TIM) 500. Alternatively, the SSD controller 320 may directly contact the chamber plate 122. The SSD controller 320 may be provided in the first receiving groove 142 of the sidewall structure 140. The sidewall structure 140 may extend upwardly from the upper surface of the chamber plate 122 to surround the SSD controller 320.

The buffer memory devices 330 may thermally contact the upper surface of the chamber plate 122 through a thermal interface material (TIM) 500. Alternatively, the buffer memory device 330 may directly contact the chamber plate 122. The buffer memory devices 330 may be provided in the second receiving groove 144 of the sidewall structure 140. The sidewall structure 140 may extend upwardly from the upper surface of the chamber plate 122 to surround the buffer memory devices 330.

The non-volatile memory devices 340 may thermally contact the upper surface of the chamber plate 122 through a thermal interface material (TIM) 500. Alternatively, the non-volatile memory device 340 may directly contact the chamber plate 122. The non-volatile memory devices 340 may be provided in the third receiving groove 146 of the sidewall structure 140. The sidewall structure 140 may extend upwardly from the upper surface of the chamber plate 122 to surround the non-volatile memory devices 340.

In some example embodiments, as illustrated in FIG. 8, the vapor chamber 130 may include the first base plate 110 and the chamber plate 122 hermetically connected to the first base plate 110. The first base plate 110 and the chamber plate 122 may define a space for receiving a heat transfer fluid therein. Outer peripheral portions of the first base plate 110 and the chamber plate 122 may be bonded to each other to form an airtight sealed space.

The chamber plate 122 of the vapor chamber 130 may thermally contact the electronic components of the memory module 300 as to absorb heat from the electronic components. Accordingly, the chamber plate 122 may serve as an evaporator, and a portion of the first base plate 110 facing the chamber plate 122 may serve as a condenser.

The chamber plate 122 and the first base plate 110 may include a plate material having strength capable of sufficiently protecting inner structures. For example, the chamber plate 122 and the first base plate 110 may include a metal such as aluminum, titanium, etc., plastic, metalized plastic, graphite, plastic combinations, etc. For example, the chamber plate 122 and the first base plate 110 may be formed using a copper plate.

Additionally, the heat dissipation chamber assembly 120 may further include a wick structure 132 which is provided in an inner surface of the vapor chamber to thermally interconnect the chamber plate 122 and the first base plate 110. The wick structure 132 may be configured to adsorb and/or absorb a liquid. For example, wick structure 132 may include a capillary structure configured to act as a wick for a liquid. In some embodiments, the wick structure 132 may include a material selected based on affinity to the liquid. For example, in the case wherein the liquid includes hydrogen bonds, the material may be a hydrophilic material. The liquid may be and/or include a heat transfer fluid. Further, the heat dissipation chamber assembly 120 may further include a support structure configured to support the wick structure 132 between the chamber plate 122 and the first base plate 110.

The support structure may include a plurality of thermal conductive pillars 134 which are arranged in the vapor chamber 130 to be spaced apart from each other. The thermal conductive pillars 134 may extend from the wick structure 132 on the chamber plate 120 to the wick structure on the first base plate 110.

When heat is generated in each of the electronic components, the heat may be transferred to the heat diffusion chamber 130 of the heat dissipation chamber assembly 120 through the thermal interface material 500. A liquid (e.g., the heat transfer fluid) may be absorbed in the capillary wick structure 132 on the inner surface of the chamber plate 122.

Then, the heat from the electronic components may be transferred to the liquid in the capillary wick structure 132 and the heat transfer fluid may evaporate into vapor. Here, the phase change of the heat transfer fluid from a liquid to a vapor may absorb the heat transferred from the electronic components, and some of the vapor may move horizontally and a remainder of the vapor may move to the first base plate 110. For example, the vapor may spread quickly along the extending direction of the heat dissipation chamber to dissipate and/or release heat through the first base plate 110 to the environment.

In some embodiments, the heat diffusion chamber 130 may include a cooling plate such as a direction-free thermal ground plane (TGP). When the cooling plate is in thermal contact with the electronic component, bubbles may be generated in the contacting portion from the heat of the electronic components, and the bubbles may push the liquid in all directions (e.g., by pressure) to perform cooling. Because the liquid is moved by pressure, excellent cooling performance may be maintained regardless of changes in the operating direction.

As illustrated in FIG. 7, the sidewall structure 140 may be adhered to the module substrate 310 of the memory module 300 by a conductive gasket 400. The conductive gasket 400 may be provided between a ground pad 312 of the module substrate 310 and the sidewall structure 140 to seal the receiving groove. For example, the conductive gasket 400 may be a liquid formation gasket (e.g., a Form-In-Place (FIP) Gasket). In some example embodiments, the liquid formation gasket may be cured in the absence of oxygen after being applied between the two metal structures. However, the example embodiments are not limited thereto; for example, the conductive gasket may be a gasket tape.

The ground pad 312 may be electrically connected to a ground pattern 314 in the module substrate 310. Accordingly, the sidewall structure 140 may be grounded through the conductive gasket 400. Thus, the sidewall structure 140 may completely seal the electronic component from the outside, thereby preventing an ESD defect and/or protecting the electronic component from contaminants such as dust.

In some example embodiments, the second case 200 may be disposed on the first case 100 with the memory module 300 interposed therebetween.

The second case 200 may include a second base plate 210 and a second sidewall portion 212 extending downwardly along a periphery of the second base plate 210. The second base plate 210 may have an inner surface and an outer surface. The second base plate 210 and the second sidewall portion 212 may be formed integrally with each other. For example, a sheet may be stamped and/or molded to form the second base plate 210 and the second sidewall portion 212. In some example embodiments, the second base plate 210 and the second sidewall portion 212 may include a metal such as aluminum.

The second case 200 may be arranged on the memory module 300 so that the upper surface of the module substrate 310 faces the second base plate 210 of the second case 200. The buffer memory devices 330 may thermally contact the inner surface of the second base plate 210 through a thermal interface material 500. Alternatively, the buffer memory devices 330 may directly contact the second base plate 210. The non-volatile memory devices 340 may thermally contact the inner surface of the second base plate 210 through a thermal interface material 500. Alternatively, the non-volatile memory devices 340 may directly contact the second base plate 210.

As mentioned above, the semiconductor device 10 may include the first case 100 and the second case 200 coupled to each other with the memory module 300 interposed therebetween. The semiconductor device 10 may include the heat dissipation chamber assembly 120 provided in at least a portion of the first base plate 110 of the first case 100. The heat dissipation chamber assembly 120 may include a heat diffusion chamber 130 in thermal contact with at least one of the electronic components mounted on the module substrate 310 of the memory module 300 and the sidewall structure 140 extending vertically toward the module substrate 310 to surround the electronic component in thermal contact with the heat diffusion chamber 130.

Accordingly, as discussed above, the heat diffusion chamber 130 may dissipate heat from the electronic component to the outside to improve and/or maximize heat dissipation performance. Further, since the sidewall structure 140 is provided to surround the electronic component and is grounded to the ground pattern of the module substrate 310, the electronic components in the receiving grooves 142, 144, and 146 may be shielded from EMI/ESD radiation noises. Further, since a mold structure for the first case 100 can be manufactured by reflecting a mold structure for the heat dissipation chamber assembly 120, an increase in manufacturing cost may be prevented and/or minimized.

Figure 9:
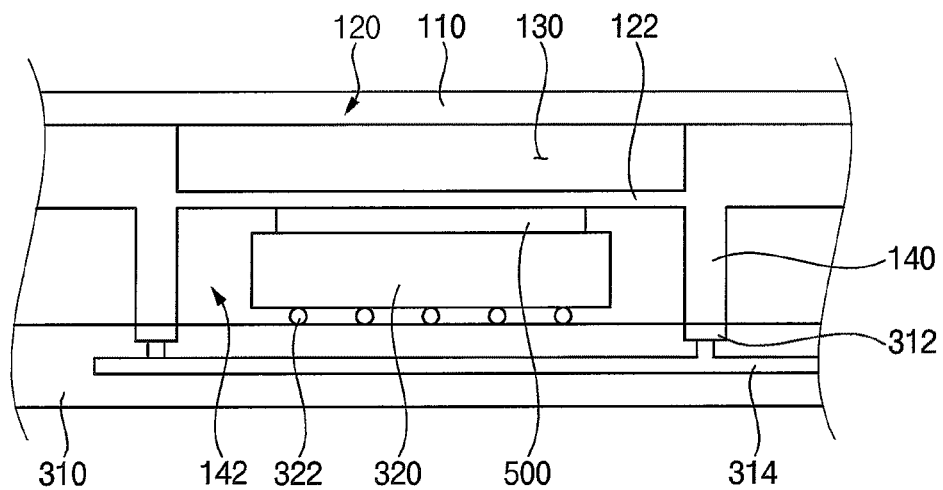

FIG. 9 is a cross-sectional view illustrating a portion of a semiconductor device in accordance with some example embodiments. The semiconductor device may be substantially the same as and/or similar to the semiconductor device described with reference to FIG. 7 except for a connection configuration of a sidewall structure. Thus, same reference numerals will be used to refer to the same or like elements, and any further repetitive explanation concerning the above elements will be omitted.

Referring to FIG. 9, a heat dissipation chamber assembly 120 of a semiconductor device may include a chamber plate 122. The heat dissipation chamber assembly 120 may be provided on a first base plate 110 to form a vapor chamber 130. The vapor chamber 130 may be in thermal contact with an electronic component 320 mounted on a module substrate 310. Additionally, the heat dissipation chamber assembly 120 may further include a sidewall structure 140 provided to extend from the chamber plate 122 toward a module substrate 310 and surround the electronic component 320.

In some example embodiments, the sidewall structure 140 may extend from the chamber plate 122 toward the module substrate 310 to contact a ground pad 312 of the module substrate 310. Accordingly, the sidewall structure 140 may completely seal the electronic component 320 from the outside, and thereby shield the electronic component 320 from EMI/ESD radiation noises.

Figure 10:
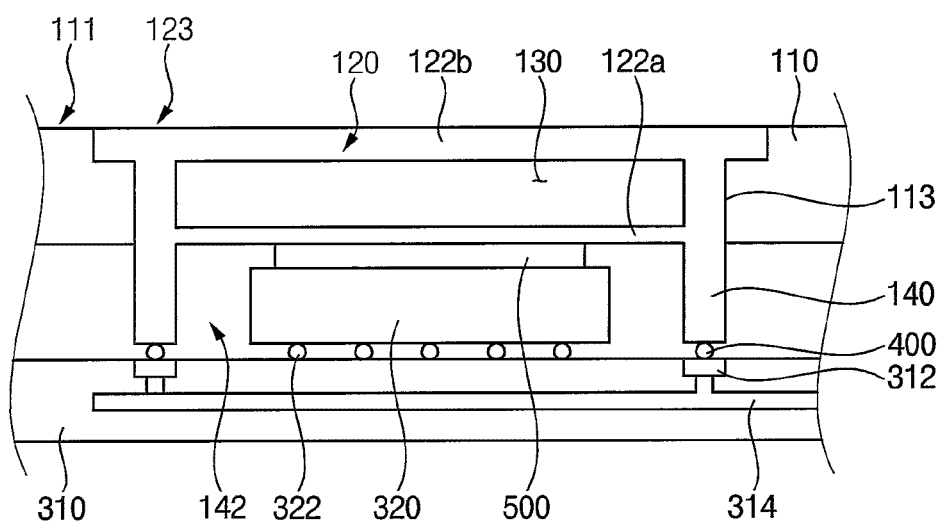

FIG. 10 is a cross-sectional view illustrating a portion of a semiconductor device in accordance with example embodiments. The semiconductor device may be substantially the same as and/or similar to the semiconductor device described with reference to FIGS. 7 and 9 except for a configuration of a heat dissipation chamber assembly. Thus, same reference numerals will be used to refer to the same or like elements, and any further repetitive explanation concerning the above elements will be omitted.

Referring to FIG. 10, a heat dissipation chamber assembly 120 of a semiconductor device may constitute a portion of a first base plate 110. The heat dissipation chamber assembly 120 may include first and second chamber plates 122a and 122b disposed in a cavity 113 of the first base plate 110. The first and second chamber plates 122a and 122b may be hermetically connected to each other to define a heat diffusion chamber 130.

In example embodiments, the cavity 113 may be formed in a portion of the first base plate 110 to penetrate the first base plate 110. The first and/or second chamber plates 122a and/or 122b of the heat dissipation chamber assembly 120 may be installed in the cavity 113. An outer surface 123 of the second chamber plate 122b may be positioned on the same plane as an outer surface 111 of the first base plate 110.

The first chamber plate 122a may thermally contact an electronic component 320 of a memory module 300 to absorb heat from the electronic component. Accordingly, in some example embodiments, the first chamber plate 122a may serve as an evaporator, and the second chamber plate 122b facing the first chamber plate 122b may serve as a condenser.

Figure 11:
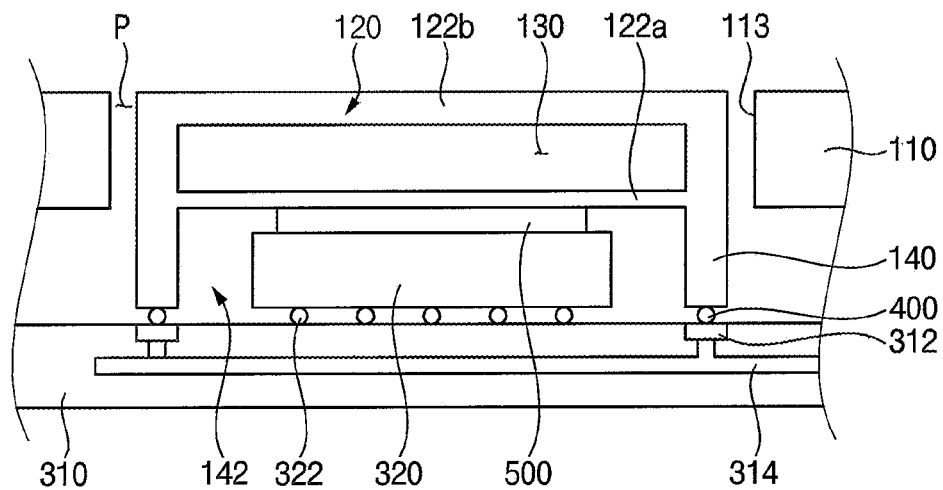

FIG. 11 is a cross-sectional view illustrating a portion of a semiconductor device in accordance with example embodiments. The semiconductor device may be substantially the same as and/or similar to the semiconductor device described with reference to FIG. 10 except for a configuration of a heat dissipation chamber assembly. Thus, same reference numerals will be used to refer to the same or like elements, and any further repetitive explanation concerning the above elements will be omitted.

Referring to FIG. 11, a heat dissipation chamber assembly 120 of a semiconductor device may constitute a portion of a first base plate 110. The heat dissipation chamber assembly 120 may include first and second chamber plates 122a and 122b disposed in a cavity 113 of the first base plate 110, and the first and second chamber plates 122a and 122b may be hermetically connected to each other to define a heat diffusion chamber 130.

In some example embodiments, the cavity 113 may be formed in a portion of the first base plate 110. The first and/or second chamber plates 122a and/or 122b of the heat dissipation chamber assembly 120 may be installed in the cavity 113. The first and second chamber plates 122a and 122b of the heat dissipation chamber assembly 120 may be arranged to be spaced apart from an inner wall of the cavity 113. A spacing passage P may be formed between sidewalls of the first and second chamber plates 122a and 122b and the inner wall of the cavity 113.

The heat dissipation chamber assembly 120 may be insulated from the first base plate 110. A case inner space, except an enclosed space of a sidewall structure 140 surrounding an electronic component 320 (e.g., the receiving grove 142), may communicate with the outside through the spacing passage P.

Figure 12:
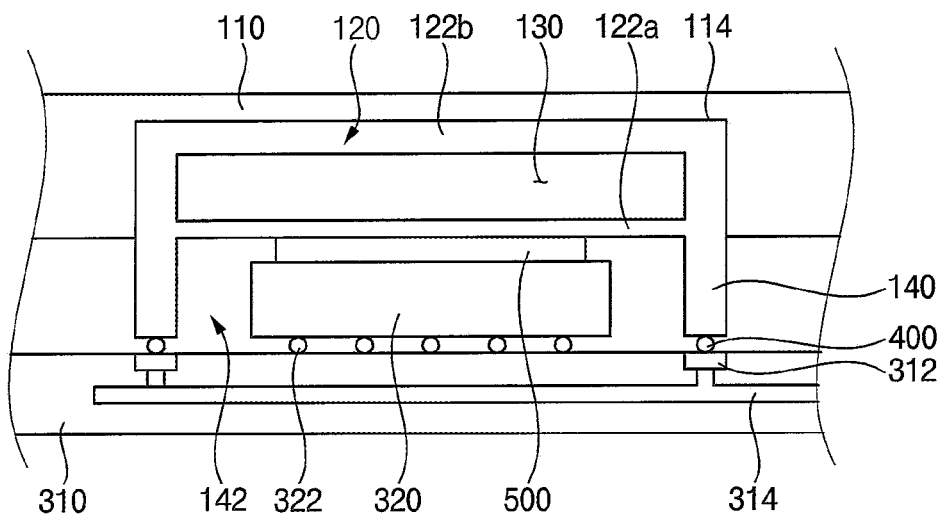

FIG. 12 is a cross-sectional view illustrating a portion of a semiconductor device in accordance with example embodiments. The semiconductor device may be substantially the same as and/or similar to the semiconductor device described with reference to FIG. 7 except for a configuration of a heat dissipation chamber assembly. Thus, same reference numerals will be used to refer to the same or like elements, and any further repetitive explanation concerning the above elements will be omitted.

Referring to FIG. 12, a heat dissipation chamber assembly 120 of a semiconductor device may include first and second chamber plates 122a and 122b disposed in a recess 114 of a first base plate 110, and the first and second chamber plates 122a and 112b may be hermetically connected to each other to define a heat diffusion chamber 130.

In some example embodiments, the recess 114 may be formed in an inner surface of the first base plate 110. The first and second chamber plates 122a and 122b of the heat dissipation chamber assembly 120 may be installed in the recess 114. An outer surface of the second chamber plate 122b may contact a bottom surface of the recess 114 of the first base plate 110.

Accordingly, heat from an electronic component 320 may be dissipated to the outside through the heat diffusion chamber 130 and the first base plate 110.

Figure 13:
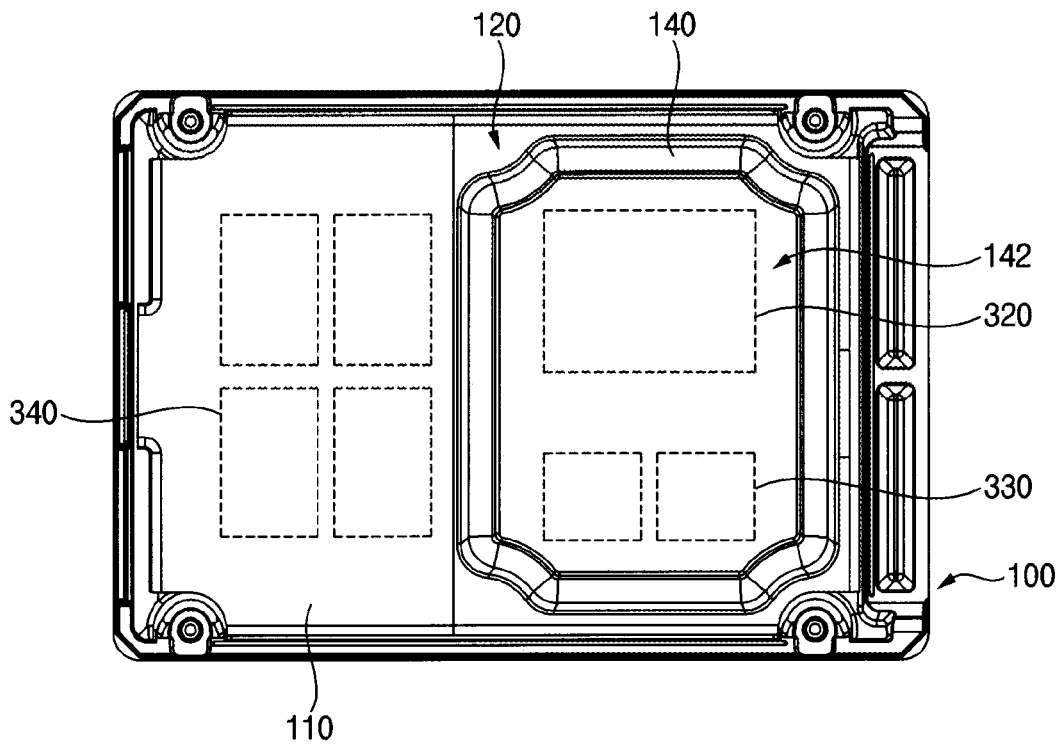

FIG. 13 is a plan view illustrating a first case of a semiconductor device in accordance with some example embodiments. The semiconductor device may be substantially the same as and/or similar to the semiconductor device 10 described with reference to FIGS. 1-6 except for a configuration of a heat dissipation chamber assembly. Thus, same reference numerals will be used to refer to the same or like elements, and any further repetitive explanation concerning the above elements will be omitted.

Referring to FIG. 13, a heat dissipation chamber assembly 120 may be provided in a portion of a first case 100. For example, the heat dissipation chamber assembly 120 may be provided in a half region of the first base plate 110. The heat dissipation chamber assembly 120 may have a planar area corresponding to some of electronic components 320 and 330 of a memory module 300.

In some example embodiments, the heat dissipation chamber assembly 120 may thermally contact some electronic components, for example, an SSD controller 320 and buffer memory devices 330. A sidewall structure 140 may include a first receiving groove 142 for receiving the electronic components in thermal contact therewith. For example, the sidewall structure 140 may extend to surround only some packages (e.g., the SSD controller 320 and the buffer memory devices 330).

Accordingly, the heat dissipation chamber assembly 120 may be in thermal contact with some of the electronic components 320 and 330, and the electronic components 320 and 330 in thermal contact therewith may be sealed in the first receiving groove 142 of the sidewall structure 140, such that the sidewall structure 140 shields against EMI/ESD radiation noises from the outside.

Figure 14:
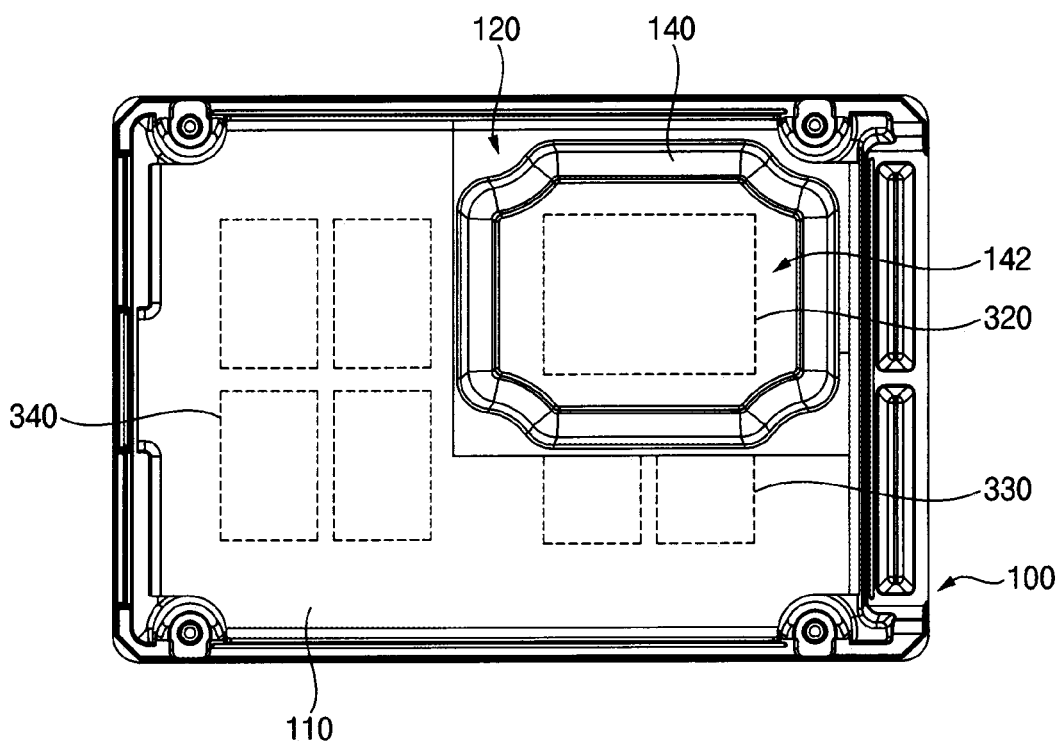

FIG. 14 is a plan view illustrating a first case of a semiconductor device in accordance with some example embodiments. The semiconductor device may be substantially the same as and/or similar to the semiconductor device described with reference to FIGS. 1-6 except for a configuration of a heat dissipation chamber assembly. Thus, same reference numerals will be used to refer to the same or like elements, and any further repetitive explanation concerning the above elements will be omitted.

Referring to FIG. 14, a heat dissipation chamber assembly 120 may thermally contact some electronic components, for example, an SSD controller 320. A sidewall structure 140 may include a first receiving groove 142 for receiving some electronic components in thermal contact therewith. For example, the sidewall structure 140 may extend to surround only one package.

Accordingly, the heat dissipation chamber assembly 120 may be in thermal contact with one electronic component 320 and the electronic component 320 in thermal contact therewith may be sealed in a receiving groove (e.g., the first receiving groove 142 in FIG. 2) of the sidewall structure 140, such that the sidewall structure 140 shields against EMI/ESD radiation noises from the outside.

Figure 15:
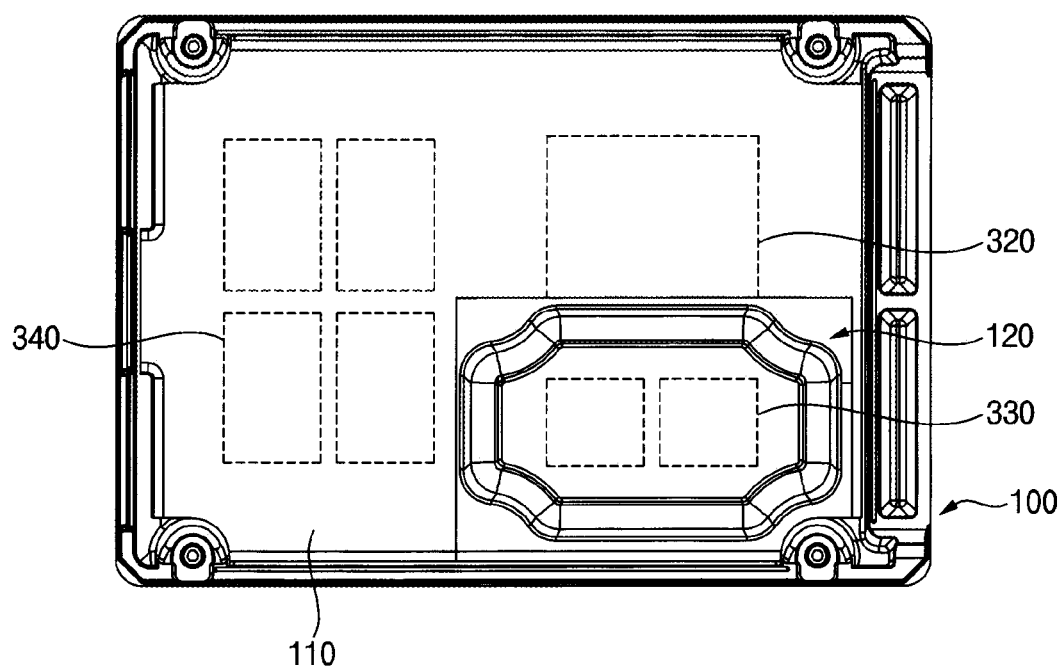

FIG. 15 is a plan view illustrating a first case of a semiconductor device in accordance with some example embodiments. The semiconductor device may be substantially the same as and/or similar to the semiconductor device described with reference to FIGS. 1-6 and/or FIG. 13 except for a configuration of a heat dissipation chamber assembly. Thus, same reference numerals will be used to refer to the same or like elements, and any further repetitive explanation concerning the above elements will be omitted.

Referring to FIG. 15, a heat dissipation chamber assembly 120 may thermally contact some electronic components, for example, buffer memory devices 330. A sidewall structure 140 may include a receiving groove (e.g., the second receiving groove 144 in FIG. 2) for receiving some electronic components in thermal contact therewith. For example, the sidewall structure 140 may extend to surround only some packages.

Accordingly, the heat dissipation chamber assembly 120 may be in thermal contact with some of the electronic components 330, and the electronic components 330 in thermal contact therewith may be sealed in the receiving groove of the sidewall structure 140, such that the sidewall structure 140 shields against EMI/ESD radiation noises from the outside.

The foregoing is illustrative of some example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A semiconductor device, comprising:
   a first case and a second case, the first case and second case defining an inner space;
   a substrate in the inner space;
   at least one electronic component on the substrate; and
   a heat dissipation chamber assembly attached to the first case such that the heat dissipation chamber assembly is between the substrate and at least a portion of the first case, the heat dissipation chamber assembly including
      a heat diffusion chamber in thermal contact with the at least one electronic component, and
      a sidewall structure extending vertically towards the substrate, the sidewall structure including at least a first sidewall and a second sidewall extending in a horizontal direction such that the first sidewall and the second sidewall define at least one receiving groove surrounding the at least one electronic component and such that a horizontal extension length of at least one of the first sidewall or the second sidewall is greater than a horizontal length of a corresponding sidewall of the at least one electronic component.

2. The semiconductor device of claim 1, wherein the heat diffusion chamber overlaps the at least one electronic component.

3. The semiconductor device of claim 1, further comprising:
a thermal interface material thermally connecting the heat diffusion chamber to the at least one electronic component.

4. The semiconductor device of claim 1, wherein the heat dissipation chamber assembly includes at least one chamber plate, the at least one chamber plate defining the heat diffusion chamber.

5. The semiconductor device of claim 4, wherein the heat dissipation chamber assembly further includes a wick structure in an inner surface of the heat diffusion chamber.

6. The semiconductor device of claim 4, wherein
the first case includes a base plate,
the at least one chamber plate is hermetically sealed to the base plate of the first case, and
the heat diffusion chamber is defined by the at least one chamber plate and the base plate of the first case.

7. The semiconductor device of claim 4, wherein
the heat dissipation chamber assembly includes a first chamber plate and a second chamber plate, with at least one of the first chamber plate or the second chamber plate in a cavity of the first case,
the first chamber plate and the second chamber plate are hermetically sealed to each other, and
the first chamber plate and the second chamber plate define the heat diffusion chamber.

8. The semiconductor device of claim 7, wherein the first chamber plate and the second chamber plate are spaced apart from an inner wall of the cavity.

9. The semiconductor device of claim 1, wherein the sidewall structure is adhered to the substrate by a conductive gasket.

10. The semiconductor device of claim 9, further comprising:
a ground pattern in the substrate; and
a ground pad connected to the ground pattern,
wherein the conductive gasket is adhered to the ground pad such that the heat dissipation chamber assembly is grounded through the ground pattern such that the sidewall structure shields the at least one electronic component from at least one of electromagnetic interference or electrostatic radiation noise.

11. A semiconductor device, comprising:
a first case including a base plate and a heat dissipation chamber assembly attached to the first case, the heat dissipation chamber assembly including a heat diffusion chamber;
a second case defining an inner space with the first case;
a substrate in the inner space between the first case and the second case; and
at least one electronic component on the substrate,
wherein the heat diffusion chamber overlaps and thermally contacts the at least one electronic component, and
wherein the heat dissipation chamber assembly includes at least a first sidewall and a second sidewall extending in a horizontal direction such that the first sidewall and the second sidewall define at least one receiving groove surrounding the at least one electronic component and such that a horizontal extension length of at least one of the first sidewall or the second sidewall is greater than a horizontal length of a corresponding sidewall of the at least one electronic component.

12. The semiconductor device of claim 11, further comprising:
a thermal interface material,
wherein the heat diffusion chamber thermally contacts the at least one electronic component through the thermal interface material.

13. The semiconductor device of claim 11, wherein the first sidewall and the second sidewall are included in a sidewall structure extending vertically toward the substrate, the sidewall structure encircling the at least one electronic component.

14. The semiconductor device of claim 13, wherein the sidewall structure is adhered to the substrate by a conductive gasket.

15. The semiconductor device of claim 14, further comprising:
a ground pattern in the substrate; and
a ground pad connected to the ground pattern,
wherein the conductive gasket is adhered to the ground pad.

16. The semiconductor device of claim 13, further comprising:
a ground pattern in the substrate; and
a ground pad connected to the ground pattern,
wherein the sidewall structure contacts the ground pad such that the heat dissipation chamber assembly is grounded through the ground pattern such that the sidewall structure shields the at least one electronic component from at least one of electromagnetic interference or electrostatic radiation noise.

17. The semiconductor device of claim 11, wherein
the heat dissipation chamber assembly includes a chamber plate hermetically connected to the base plate, and
the chamber plate and the base plate define the heat diffusion chamber.

18. The semiconductor device of claim 11, wherein
the heat dissipation chamber assembly includes a first chamber plate and a second chamber plate, with at least one of the first chamber plate or the second chamber plate in a cavity of the base plate,
the first chamber plate and the second chamber plate are hermetically connected to each other, and
the first chamber plate and the second chamber plate define the heat diffusion chamber.

19. The semiconductor device of claim 18, wherein the first chamber plate and the second chamber plate are spaced apart from an inner wall of the cavity.

20. The semiconductor device of claim 11, wherein the heat dissipation chamber assembly further includes a wick structure in an inner surface of the heat diffusion chamber.

* * * * *